(12) United States Patent
Nakano et al.

(10) Patent No.: US 8,059,179 B2
(45) Date of Patent: Nov. 15, 2011

(54) SOLID STATE IMAGE CAPTURING APPARATUS AND CAMERA APPARATUS

(75) Inventors: Hiromi Nakano, Fukuoka (JP); Yasuaki Hisamatsu, Kanagawa (JP)

(73) Assignee: Sony Corporation, Tokyo (JP)

( * ) Notice: Subject to any disclaimer, the term of this patent is extended or adjusted under 35 U.S.C. 154(b) by 359 days.

(21) Appl. No.: 12/354,531

(22) Filed: Jan. 15, 2009

(65) Prior Publication Data

US 2009/0219428 A1 Sep. 3, 2009

(30) Foreign Application Priority Data

Feb. 29, 2008 (JP) ................. 2008-051365

(51) Int. Cl.
*H04N 3/14* (2006.01)
*H04N 5/225* (2006.01)

(52) U.S. Cl. ............... 348/308; 348/220.1; 348/272; 348/311

(58) Field of Classification Search .................. None
See application file for complete search history.

(56) References Cited

U.S. PATENT DOCUMENTS

| 5,206,730 | A  | * | 4/1993  | Sakai ................... 348/220.1 |
| 6,433,822 | B1 | * | 8/2002  | Clark et al. ............. 348/241 |
| 6,870,566 | B1 | * | 3/2005  | Koide et al. ............ 348/296 |
| 7,623,173 | B2 | * | 11/2009 | Nitta et al. ............ 348/302 |
| 2004/0095497 | A1 | * | 5/2004 | Compton et al. ....... 348/312 |
| 2005/0195304 | A1 |   | 9/2005 | Nitta et al. |

* cited by examiner

*Primary Examiner* — Luong T Nguyen
(74) *Attorney, Agent, or Firm* — Robert J. Depke; Rockey Depke & Lyons, LLC

(57) ABSTRACT

A solid state image capturing apparatus is disclosed. A pixel array section has unit pixels containing photoelectric conversion elements, the unit pixels being two-dimensionally arranged in a matrix, and column signal wires correspondingly to columns of the matrix of the unit pixels. A line scanning section selectively controls lines of the matrix of the unit pixels of the pixel array section. An analog-to-digital conversion section converts an analog signal outputted from unit pixels of a line of the matrix of the unit pixels selected by the line scanning section through a corresponding column signal line to a digital signal. A conversion clock supply section selectively generates a conversion clock having a first clock period or a second clock period. An addition section adds unit pixel digital signals converted in the analog-to-digital conversion section by the conversion clocks having the first clock period and the second clock period, respectively.

6 Claims, 10 Drawing Sheets

FIG. 6

| R11 100 | G12 100 | R13 100 | G14 0 | R15 0 | G16 0 | R17 0 | G18 0 |
|---|---|---|---|---|---|---|---|
| G21 100 | B22 100 | G23 100 | B24 0 | G25 0 | B26 0 | G27 0 | B28 0 |
| R31 100 | G32 100 | R33 100 | G34 0 | R35 0 | G36 0 | R37 0 | G38 0 |
| G41 100 | B42 100 | G43 100 | B44 0 | G45 0 | B46 0 | G47 0 | B48 0 |
| R51 100 | G52 100 | R53 100 | G54 0 | R55 0 | G56 0 | R57 0 | G58 0 |
| G61 100 | B62 100 | G63 100 | B64 0 | G65 0 | B66 0 | G67 0 | B68 0 |

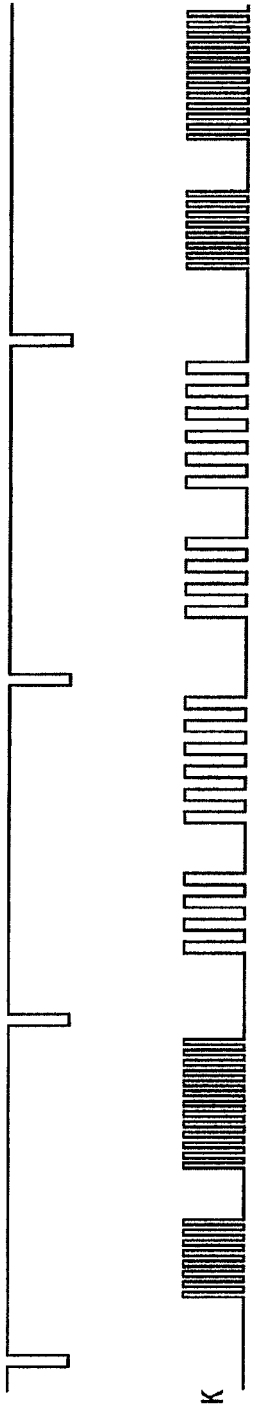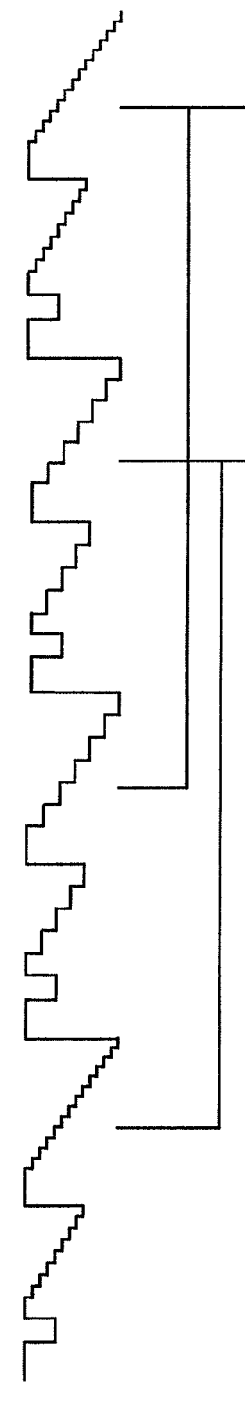
FIG. 7A H SYNCHRONIZATION
FIG. 7B COUNTER & DAC CLOCK
FIG. 7C OUTPUT OF FREQUENCY DIVIDER
FIG. 7D RAMP WAVEFORM
FIG. 7E ADDED STATE

SOLID STATE IMAGE CAPTURING APPARATUS AND CAMERA APPARATUS

CROSS REFERENCES TO RELATED APPLICATIONS

The present invention contains subject matter related to Japanese Patent Application JP 2008-051365 filed in the Japanese Patent Office on Feb. 29, 2008, the entire contents of which being incorporated herein by reference.

BACKGROUND OF THE INVENTION

1. Field of the Invention

The present invention relates to a solid state image capturing apparatus and a camera apparatus having the same and, in particular, relates to those that convert analog signals that are output from unit pixels through column signal wires into digital signals and read the digital signals.

2. Description of the Related Art

In recent years, a column-parallel ADC equipped CMOS image sensor has been proposed. In this CMOS image sensor, analog-digital converters (hereinafter abbreviated as ADCs) are disposed correspondingly to columns of a matrix of unit pixels.

FIG. 1 is a block diagram showing a structure of a column-parallel ADC equipped CMOS image sensor 10 of the related art. In FIG. 1, a unit pixel 101 has a photodiode and an in-pixel amplifier. The pixels 101 are two-dimensionally arranged in a matrix shape and compose a pixel array section 102. Line control wires 103 (103-1, 103-2, and so forth) and column signal wires 104 (104-1, 104-2, and so forth) are, respectively, arranged for individual lines and individual columns of the matrix shaped pixel arrangement of the pixel array section 102. Line addresses and line scanning of the pixel array section 102 are controlled through the line control wires 103-1, 103-2, and so forth by a line scanning circuit 105.

ADCs 106 corresponding to the column signal wires 104-1, 104-2, and so forth are disposed on one end side of respective column signal wires and compose a column process section (column-parallel ADC block) 107. A digital-to-analog converter 108 that generates a ramp waveform reference voltage Vref for the ADCs 106 (hereinafter this converter is referred to as the DAC) is disposed. In addition, a counter 109 is disposed for the ADCs 106. The counter 109 counts in synchronization with a clock CK having a predetermined period and measures a time for a comparator 110 that will be described later to perform a comparison operation.

The ADC 106 has the comparator 110 that compares an analog signal, obtained from a unit pixel 101 of a selected line of the matrix through the column signal wire 104-1, 104-2, or the like, with a ramp waveform reference voltage Vref generated by the DAC 108. In addition, the ADC 106 has a memory 111 that stores a count value of the counter 109 based on a comparison output of the comparator 110 to provide a function of converting analog signals supplied from the unit pixels 101 into an N-bit digital signal.

The column addresses and column scanning of the ADCs 106 of the column process section 107 are performed by a column scanning circuit 112. In other words, N-bit digital signals that are digitally converted by the ADCs 106 are columnwise scanned by the column scanning circuit 112, read by a horizontal output wire 113 having an 2N-bit width, and sent to a signal process circuit 114 by a horizontal output wire 113. The signal process circuit 114 is composed of 2N sense circuits, 2N subtraction circuits, 2N output circuits, and so forth corresponding to the 2N-bit wide horizontal output wire 113.

A timing control circuit 115 generates clock signals and timing signals, with which the line scanning circuit 105, the ADCs 106, the DAC 108, the counter 109, the column scanning circuit 112, and so forth operate, based on a master clock MCK. The generated clock signals and timing signals are supplied to relevant circuit sections.

Next, the operation of the CMOS image sensor 10 shown in FIG. 1 will be outlined with reference to timing charts shown in FIG. 2A to FIG. 2C.

FIG. 2A shows a horizontal synchronous signal (H synchronization). FIG. 2B shows a clock supplied to the DAC 108, and the counter 109. FIG. 2C shows a ramp waveform reference voltage Vref that is output from the DAC 108.

The voltage of the ramp waveform changes as the clock occurs. The voltage of the ramp waveform and the output of a unit pixel are compared. The count value corresponding to the voltage of the unit pixel obtained by the comparison is stored in a memory 111. The count value stored in the memory 111 becomes a digital value of the unit pixel and is output.

FIG. 3A to FIG. 3F are timing charts showing an example of the more detailed operation of the CMOS image sensor 10.

With reference to FIG. 3A to FIG. 3F, after the first read operation from unit pixels 101 of a selected line to column signal wires 104-1, 104-2, and so forth has been established, a lamp waveform reference voltage Vref shown in FIG. 3A is supplied from the DAC 108 to the comparators 110. Thus, the comparators 110 compare the signal voltages Vx of the column signal wires 104-1, 104-2, and so forth with the reference voltage Vref. In this comparison operation, when the reference Vx becomes the same as the signal voltage Vx, the polarity of the output of the comparator 110 is inverted. When the output of the comparator 110 is inverted, the memory 111 stores a count value N1 of the counter 109 corresponding to a comparison time of the comparator 110. FIG. 3C shows a clock that generates a count value. FIG. 3D shows changes of the count value N.

In the first read operation, as shown in FIG. 3E, a reset component ΔV of each unit pixel 101 is read. The reset component Δ contains as an offset a fixed pattern noise that varies between unit pixels 101. However, the fluctuation of the reset component is generally small and the reset level is common in all pixels. Thus, in the first read operation, the signal voltage Vx of each of the column signal wires is nearly known. Consequently, when the reset component ΔV is read in the first read operation, by adjusting the ramp waveform reference voltage Vref, the comparison time of the comparator 110 can be relatively shortened.

In the second read operation, in addition to the reset component ΔV, a signal component corresponding to the amount of incident light of each of the unit pixels 101 is read in the same manner as the first read operation. In other words, after the second read operation from unit pixels 101 of the selected line to the column signal wires 104-1, 104-2, and so forth has been established, the ramp waveform reference voltage Vref is supplied from the DAC 108 to the comparator 110. Thus, the comparators 110 compare the signal voltage Vx of the column signal wires 104-1, 104-2, and so forth with the reference voltage Vref.

When the reference voltage Vref is supplied to the comparators 110, the counter 109 performs a second counting operation. In the second counting operation, when the reference voltage Vref becomes the same as the reference voltage Vx, the polarity of the output of the comparator 110 is inverted. When the output of the polarity is inverted, as shown in FIG. 3F, the memory 111 stores a count value N2 of the counter 109 corresponding to a comparison time of the comparator 110. At this point, the first count value N1 and the second count value N2 are stored in different locations of the memory 111.

After the foregoing sequence of the AD conversion operations has been complete, the column scanning circuit 112 scans respective columns. As a result, the first and second N bit digital signals stored in the memory 111 are supplied to the signal process circuit 114 through the 2N-bit wide horizontal output wire 113. A subtraction circuit (not shown) of the signal process circuit 114 performs a subtraction process of (second operation signal)–(first operation signal). Thereafter, the resultant signal is output to the outside of the CMOS image sensor 10. Thereafter, the same operation is repeated for each line and thereby a two-dimensional image is generated.

Japanese Unexamined Patent Application Publication No. 2005-278135, hereinafter referred to as Patent Document 1, describes an example of a solid state image capturing apparatus shown in FIG. 1.

SUMMARY OF THE INVENTION

To capture an image at high speed, a technique of reading pixel information while performing thinning out to improve the frame rate may be used. Using this technique, in the all-pixel reading system that reads signals of all pixels in one frame, the frame rate may be improved from 30 frames/second to 60 frames/second. In other words, if pixel information that is output is read while every another line is thinned out and thereby the number of lines to be read is halved, the frame rate can be doubled.

When the pixels are thinned out, for example, using both a technique of thinning out them in the vertical direction and a technique of adding pixels in the vertical direction, the resolution is reduced in the vertical direction.

For example, it is assumed that as shown in FIG. 4, pixels R having a red filter and pixels G having a green filter are alternately arranged in the vertical direction as a vertical arrangement of unit pixels 101 of the CMOS image sensor 10. This arrangement is an example of a primary color Bayer arrangement of color filters. Assuming that the number of pixels in the vertical direction is thinned out to ½ of the original number, signals of two adjacent pixels R are simply added and thereby an added pixel signal Rx is generated. Likewise, signals of two adjacent pixels G are simply added and thereby an added pixel signal Gx is generated. The spatial position of the center of gravity of the added pixel signal Rx or the added pixel signal Gx is the intermediate position of the two pixels R or two pixels G that have been added. However, since the red pixels R and the green pixels G are alternately arranged, the spatial positions of the center of gravity of the added pixel signal Rx and the added pixel signal Gx become irregular as shown in FIG. 4.

In other words, when the arrangement of the spatial positions of the center of gravity of the added pixel signal Rx and added pixel signal Gx shown in the right-hand side of FIG. 4 is viewed from above, the interval of first signals Rx and Gx is short and the interval of the first signal Gx and the second signal Rx is long. Likewise, the intervals alternately become short, long, short, long, and so forth.

If such two pixels are simply added in the vertical direction, false colors may adversely occur in the resultant added signal. An example of occurrence of false colors will be described in an embodiment that follows. In brief, it can be said that when a plurality of pixel signals are added, false colors that are different from original colors occur in pixel signals where colors largely change.

If such false colors occur, image signals obtained as an output of an image sensor result in deterioration of their image quality.

In view of the foregoing, it would be desirable to solve a problem of false colors that occur when pixel signals are added.

According to an embodiment of the present invention, there is provided a solid state image capturing apparatus including a pixel array section, a line scanning section, an analog-to-digital conversion section, a conversion clock supply section, and an addition section. The pixel array section has unit pixels containing photoelectric conversion elements, the unit pixels being two-dimensionally arranged in a matrix, and column signal wires being arranged correspondingly to columns of the matrix of the unit pixels. The line scanning section selectively controls lines of the matrix of the unit pixels of the pixel array section. The analog-to-digital conversion section converts an analog signal that is output from unit pixels of a line of the matrix of the unit pixels selected by the line scanning section through a corresponding column signal line to a digital signal. The conversion clock supply section selectively generates a conversion clock having a first clock period or a conversion clock having a second clock period that is supplied to the analog-to-digital conversion section and supplies a generated conversion clock to the analog-to-digital conversion section. The addition section adds unit pixel digital signals converted in the analog-to-digital conversion section by the conversion clocks having the first clock period and the second clock period, respectively, and outputs an added pixel signal.

According to an embodiment of the present invention, there is provided a camera apparatus including the solid state image capturing apparatus and an image signal process section. The image signal process section processes the digital signal that is output from the addition section into an image signal having a predetermined format.

According to embodiments of the present invention, when the analog-digital conversion section digitally converts a unit pixel signal, a pixel signal converted by the analog-digital conversion section driven with a clock having a first clock period and a pixel signal converted by the analog-digital conversion section driven with a clock having a second clock period that is different from the first clock period are alternately obtained in a selection order. When the clock periods are changed, converted digital signals are differently weighted. Thus, when the addition section adds a signal digitally converted with the clock having the first clock period and a signal digitally converted with the clock having the second clock period, a plurality of differently weighted pixel signals are added. As a result, the position of the center of gravity of the added signal can be shifted from that of a simply added signal.

According to embodiments of the present invention, when the addition section adds a signal digitally converted with the clock having the first clock period and a signal digitally converted with the clock having the second clock period, a plurality of pixel signals differently weighted are added. As a result, the position of the center of gravity of the added signal can be sifted from that of a simply added signal. Thus, unit pixels can be arranged such that false colors are prevented. As a result, when the number of pixels to be read is thinned out and thereby the frame rate is improved, embodiments of the present invention contribute to improve image quality.

BRIEF DESCRIPTION OF THE DRAWINGS

The invention will become more fully understood from the following detailed description, taken in conjunction with the accompanying drawings, wherein similar reference numerals denote corresponding elements throughout the several drawings, in which:

FIG. 6 is a descriptive schematic diagram showing an example of a pixel arrangement of the solid state image capturing apparatus according to the first embodiment of the present invention;

FIG. 7A to FIG. 7E are timing charts showing an example of signal output operations of the solid state image capturing apparatus according to the first embodiment of the present invention;

DETAILED DESCRIPTION OF THE PREFERRED EMBODIMENTS

Figure 1:
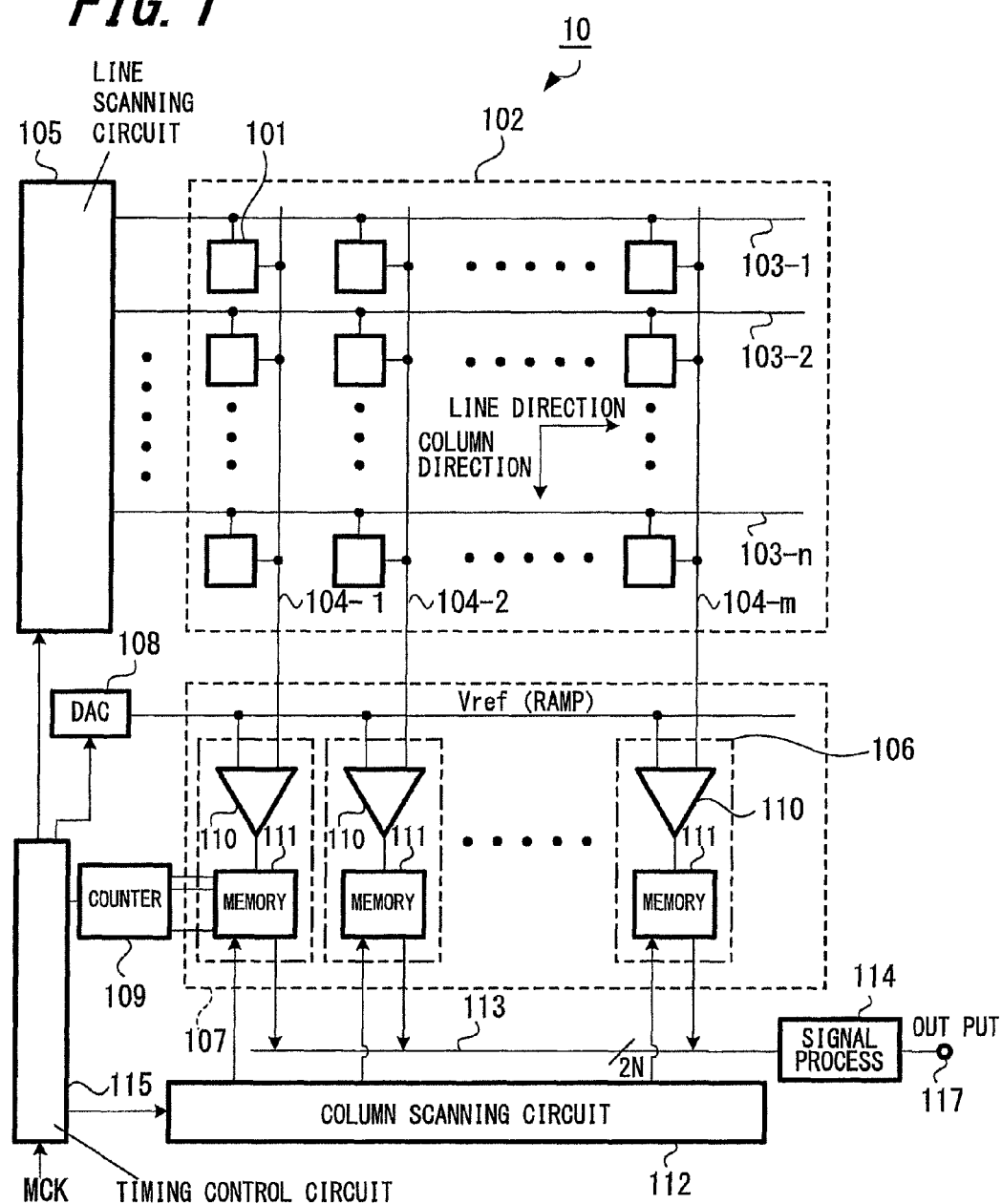
FIG. 1 is a schematic diagram showing an example of the structure of a solid state image capturing apparatus according to a related art.
Figure 2:
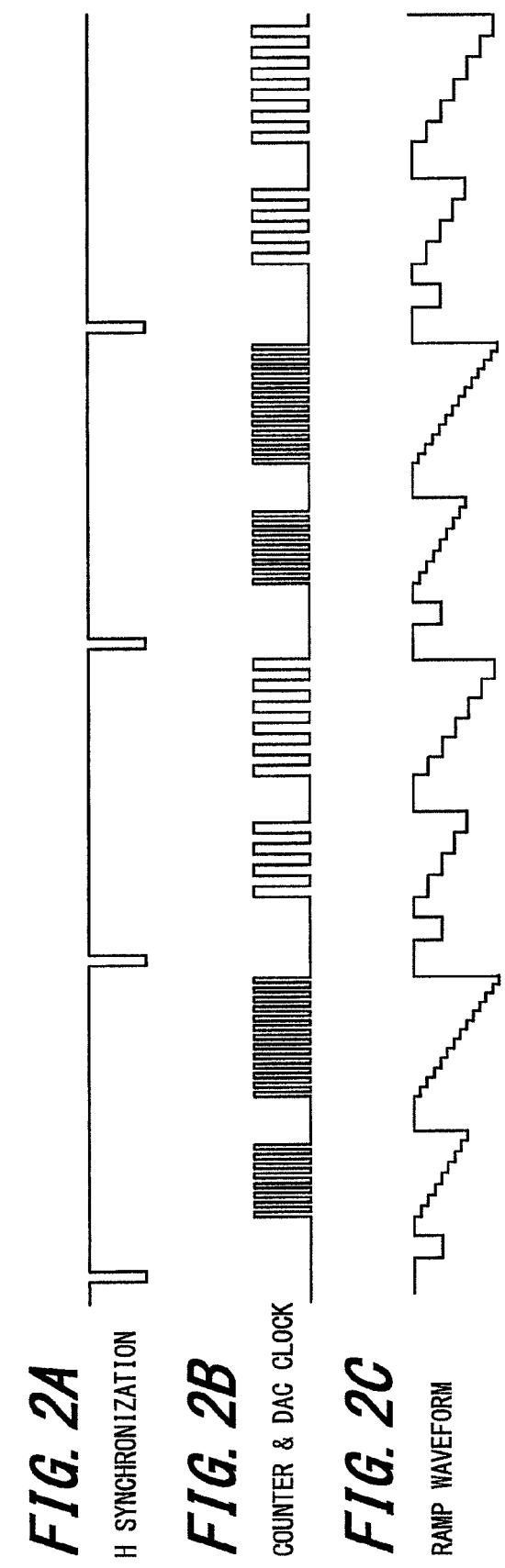
FIG. 2A to FIG. 2C are timing charts showing an example of signal output operations of the solid state image capturing apparatus shown in FIG. 1.
Figure 3:
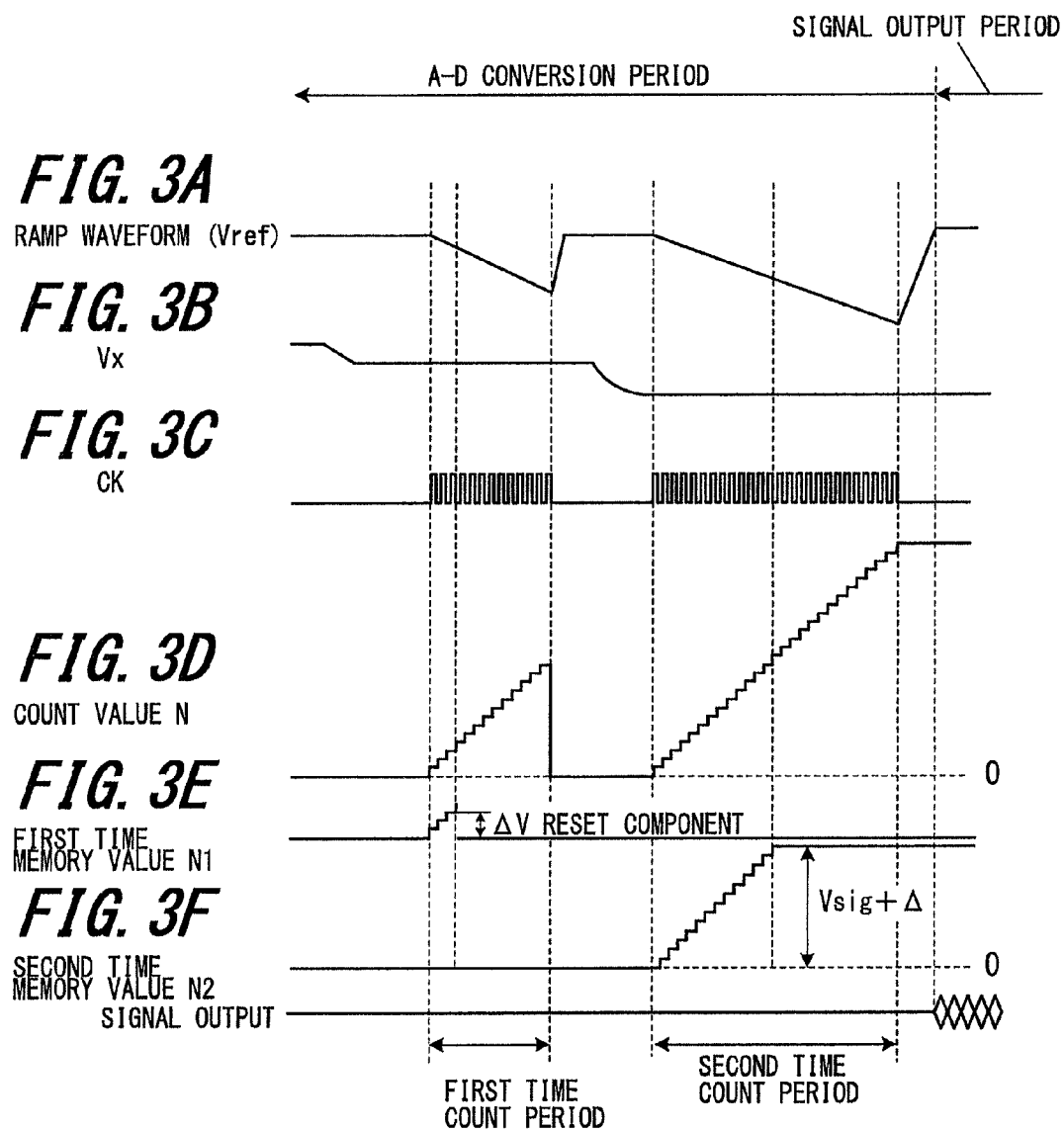
FIG. 3A to FIG. 3F are timing charts showing an example of in more detail the signal output operations of the solid state image capturing apparatus shown in FIG. 1.

Next, with reference to FIG. 5 to FIG. 10, a first embodiment of the present invention will be descried. In FIG. 5 to FIG. 10, similar sections to those in FIG. 1 to 4 are noted by similar reference numerals and their description will be omitted.

Figure 5:
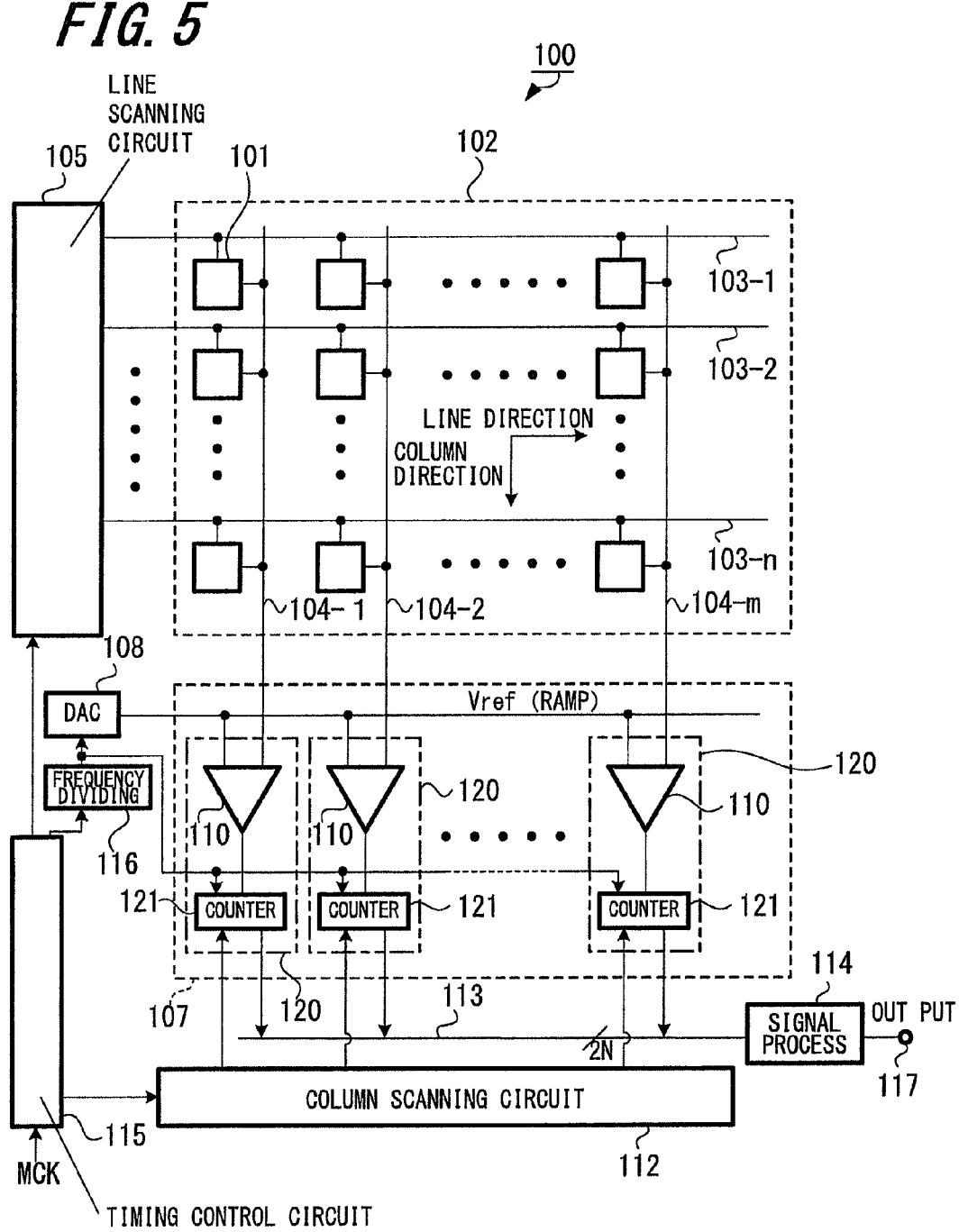
FIG. 5 is a schematic diagram showing an example of the structure of a solid state image capturing apparatus according to a first embodiment of the present invention.

FIG. 5 is a schematic diagram showing an example of the structure of a solid state image capturing apparatus according to this embodiment.

Like the solid state image capturing apparatus according to a related art shown in FIG. 1, the solid state image capturing apparatus according to this embodiment is a column-parallel ADC equipped CMOS image sensor having analog-digital conversion (ADC) sections correspondingly to columns of a matrix of unit pixels.

The column-parallel ADC equipped CMOS image sensor 100 has unit pixels 101 each of which composes a pixel. Each of the unit pixels 100 has a photodiode and an in-pixel amplifier. The unit pixels 100 are two-dimensionally arranged in a matrix shape and compose a pixel array section 102. Provided to the matrix shaped pixel arrangement of the pixel array section 102 are line control wires 103 (103-1, 103-2, and so forth) corresponding to individual lines of the matrix and column signal wires 104 (104-1, 104-2, and so forth) corresponding to individual columns of the matrix. Line addresses and line scanning of the pixel array section 102 are controlled by the line scanning circuit 105 through the line control wires 103-1, 103-2, and so forth.

ADCs 120 corresponding to the column signal wires 104-1, 104-2, and so forth are disposed on one side of respective signal wires and compose a column process section (column-parallel ADC block) 107. A digital-analog converter (hereinafter referred to as the DAC) 108 that generates a ramp waveform reference voltage Vref for each of the ADCs 120 is disposed. Each of the ADCs 120 corresponding to respective columns, to which the output of the DAC 108 is supplied, has a comparator 110 and a counter 121 that measures a time for the comparator 110 to perform a comparison operation. The comparator 110 of each column compares a ramp waveform supplied from the DAC 108 and signals of respective unit pixels of the matrix. The counter 121 performs a count operation in synchronization with a clock CK supplied from a frequency divider 116 (as a conversion clock supply section) that will be described later, measures a time for the comparator 110 to perform a comparison operation, latches the count value N of the measured time, and outputs the count value N.

In this embodiment, the counter 121 performs the count operation and the latch operation. Instead, a latch circuit or a memory circuit that stores the count output of the counter may be disposed separately from the counter 121.

In this embodiment, a timing control circuit 115 that composes a digital conversion clock supply section supplies a clock to the DAC 108 and the counter 121 through a frequency divider 116. The frequency divider 116 selectively divides the clock frequency to change the clock frequency under the control of the timing control circuit 115. The frequency divider 116 changes, for example, the frequency of the clock signal that is output from the timing control circuit 115 into a clock signal having a frequency of a reciprocal of a power of two of the original frequency. Instead, the frequency of the clock may be changed to a frequency other than a reciprocal of a power of two of the original frequency.

The state in which the clock frequency is changed by the frequency divider 116 or the state in which the clock frequency is not changed is set up for each read period of the unit pixels 101 under the control of the timing control circuit 115. However, the process of changing the clock frequency is executed when the unit pixel signals are thinned out in the vertical direction. When the pixel signals are not thinned out in the vertical direction, the clock is fixed at a high frequency. The state in which the clock frequency is changed will be described later.

The clock generated in such a manner is supplied as a ramp waveform generation clock to the DAC 108 and as a count operation clock to each of the counters 121 corresponding to the individual columns.

Each of the ADCs 120 corresponding to the individual columns has a comparator 110 that compares an analog signal, obtained from the unit pixel 101 of a selected line of the matrix through the column signal wire 104-1, 104-2, or the like, with the reference voltage Vref. In addition, each of the ADCs 120 has a counter 121 that performs a count operation in synchronization with the clock CK supplied from the frequency divider 116. The counter 121 measures a time for the comparator 110 to perform the comparison operation, latches a count value N of the measured time, and outputs the count value N to convert an analog signal supplied from a unit pixel 101 into an N-bit digital signal.

Column addresses and column scanning of the ADCs 120 of the column process section 107 are controlled by a column scanning circuit 112. In other words, an N-bit digital signal converted by each of the ADCs 120 is read by the column scanning circuit 112 into a 2N-bit wide horizontal output wire 113 and sent to a signal process circuit 114 (as an addition section) through the horizontal output wire 113. The signal process circuit 114 is composed of 2N sense circuits, 2N subtraction circuits, 2N output circuits, and so forth corresponding to the 2N-bit wide horizontal output wire 113. An image signal processed by the signal process circuit 114 is output from an output section 117.

Based on the master clock MCK, the timing control circuit 115 generates a clock signal and a timing signal necessary to operate the line scanning circuit 105, the ADCs 120, the column scanning circuit 112, and so forth as well as the clock supplied to the DAC 108 and the counters 121. The generated clock signals and timing signals are supplied to the corresponding circuit sections.

FIG. 6 is a schematic diagram showing an example of an array of pixels 101 of the CMOS image sensor 100. FIG. 6 shows a part of the array of the pixels 101. The array shown in FIG. 6 is repeated for the number of pixels.

The color filter array shown in FIG. 6 exemplifies signal levels obtained from individual pixels of the primary color Bayer array. Squares of FIG. 6 show the positions of unit pixels. R, G, and B shown in individual squares represent the types of color filters: red, green, and blue. Two numeric values preceded by each of R, G, and B represent the position of the pixel. The left numeric value represents the vertical pixel position counted from the topmost position of the array and the right numeric value represents the horizontal pixel position counted from the leftmost position of the array. For example, the pixel "R35" denotes that the color of the filter is red and that the pixel is at the third vertical position from the top and fifth horizontal position from the left.

In the example shown in FIG. 6, a numeric value below R, G, or B represents the signal level of light received by the pixel. The signal level represents a value that has been digitally converted by the corresponding ADC 120 shown in FIG. 5. If the ADC 120 is an 8-bit converter, the signal level of each unit pixel ranges from "0" to "255". In FIG. 6, there are pixels whose signal levels are "0" and "100".

In the state shown in FIG. 6, the signal level largely changes from "100" to "0" between the third leftmost and fourth leftmost pixels in the horizontal direction. In a region where signal levels largely change, pixel signals are difficult to be accurately interpolated by thinning out and adding them, and as was described in "SUMMARY OF THE INVENTION", false colors tend to occur. FIG. 6 exemplifies the case that signal levels change in the horizontal direction. False colors more often tend to occur in the case that signal levels change in the vertical direction.

In this embodiment, with the structure shown in FIG. 5, a process of effectively preventing false colors from occurring is accomplished. Next, the process of preventing false colors from occurring will be exemplified.

FIG. 7A to FIG. 7E are timing charts that show operation states of the CMOS image sensor 100 shown in FIG. 5. The timing charts shown in FIG. 7A to FIG. 7E exemplify the operation states of the CMOS image sensor 100 in the case that pixels are thinned out in the vertical direction.

FIG. 7A shows a horizontal synchronization signal (H synchronization). FIG. 7B shows a clock supplied to the DAC 108 and the counters 109. FIG. 7C shows the type (d1 or d2) of the clock supplied to the DAC 108 and the counters 121. FIG. 7D shows a ramp waveform reference voltage Vref that is output from the DAC 108.

The voltage of the ramp waveform changes in synchronization with occurrence of a clock. The voltage of the ramp waveform and the output of a unit pixel are compared. A count value corresponding to the voltage of the unit pixel is detected in the comparison and stored by the counter 121. The count value stored by the counter 121 becomes a digital value of the unit pixel and is output. Although FIG. 7A to FIG. 7E do not show changes of the count value of the counter 121, the process of changing the count value shown in FIG. 3A to FIG. 3F can be applied. In other words, as shown in FIG. 3D, in each of a reset component detection period and a pixel signal component detection period, the count value is up-counted. Thus, the count value can be up-counted two times in one horizontal synchronization period. Instead, the count value may be up-counted in another manner as will be described later.

Returning to the description of FIG. 7A to FIG. 7E, as shown in FIG. 7C, either of a clock d1 having a first clock period or a clock d2 having a second clock period is selected as an output of the frequency divider 116 for each horizontal period. FIG. 7C shows an example of the case that the frequency divider 116 selects the first clock period for one horizontal synchronization period and the second clock period for the next two horizontal synchronization periods.

Thus, as shown in FIG. 7B, there are two states of the clock supplied to the DAC 108 and the counters 121: a high frequency state and a low frequency state. Likewise, as the clock frequency is changed, there are two states of the ramp signal: a high resolution state and a low resolution state. However, the data phase range is fixed for each line and only resolution is changed.

In such a manner, the ramp waveform is supplied to the comparator 110 of each ADC 120 and is compared with the unit pixel signal. The count value of the counter 121 at which the comparison output is changed is stored. Thus, the stored value becomes a signal weighted according to the clock period. The value stored in the counter 121 is output as a digital value of the unit pixel. The signal process circuit 114 adds the signals of the adjacent pixels of the same color filters. The output section 117 outputs the resultant added signal.

In the example shown in FIG. 7A to FIG. 7E, in the first horizontal synchronization period on the extreme left, the ADC 120 of a certain column processes a red (R) unit pixel signal. In the next horizontal synchronization period, the ADC 120 processes a green (G) unit pixel signal. In the further next horizontal synchronization period, the ADC 120 processes a red (R) unit pixel signal. In this case, as shown in FIG. 7E, two red (R) unit pixel signals spaced for one horizontal synchronization period are added. In addition, two green (R) unit pixel signals spaced by one horizontal synchronization period are added. The two added signals are signals that have been digitally converted with different resolutions. Thus, the added signals have been weighted.

When all unit pixels 101 of the pixel array section 102 are read (namely, pixels are not added), the cock shown in FIG. 7B is fixed at a high frequency. Thus, in this case, the resolution of the ramp waveform does not change.

Figure 8:
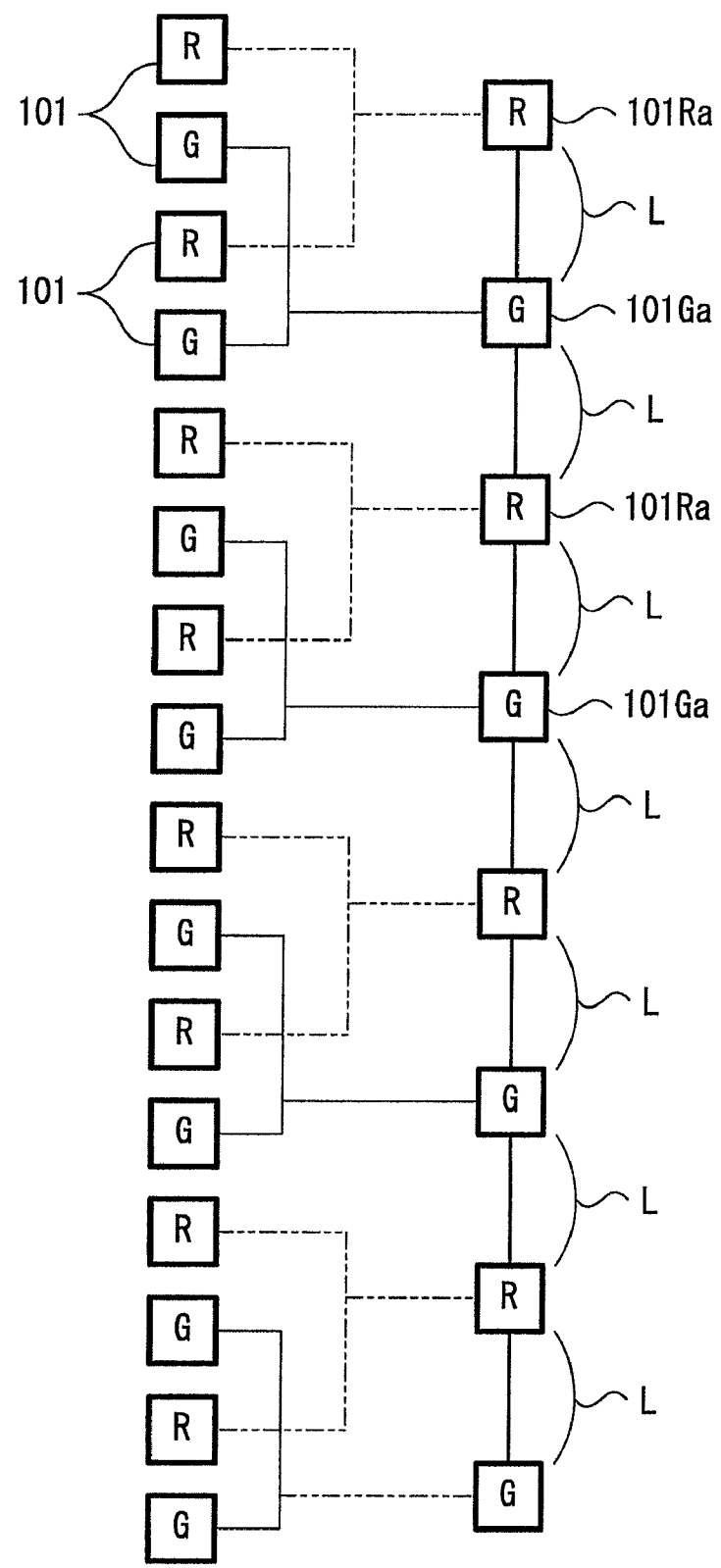
FIG. 8 is a descriptive schematic diagram showing an example of a pixel addition according to the first embodiment of the present invention.

FIG. 8 exemplifies a vertical addition state of this embodiment. As a vertical array of the unit pixels 101 of the CMOS image sensor 100 in a vertical column, it is assumed that a red-filtered pixel R and a green-filtered pixel G are alternately arranged. This array is the same as that shown in FIG. 4.

If the number of pixels are thinned out to the half in the vertical direction, signals of two adjacent pixels R are added and an added pixel signal Ra is generated. Likewise, signals of two adjacent pixels G are added and an added pixel signal Ga is generated.

Figure 4:
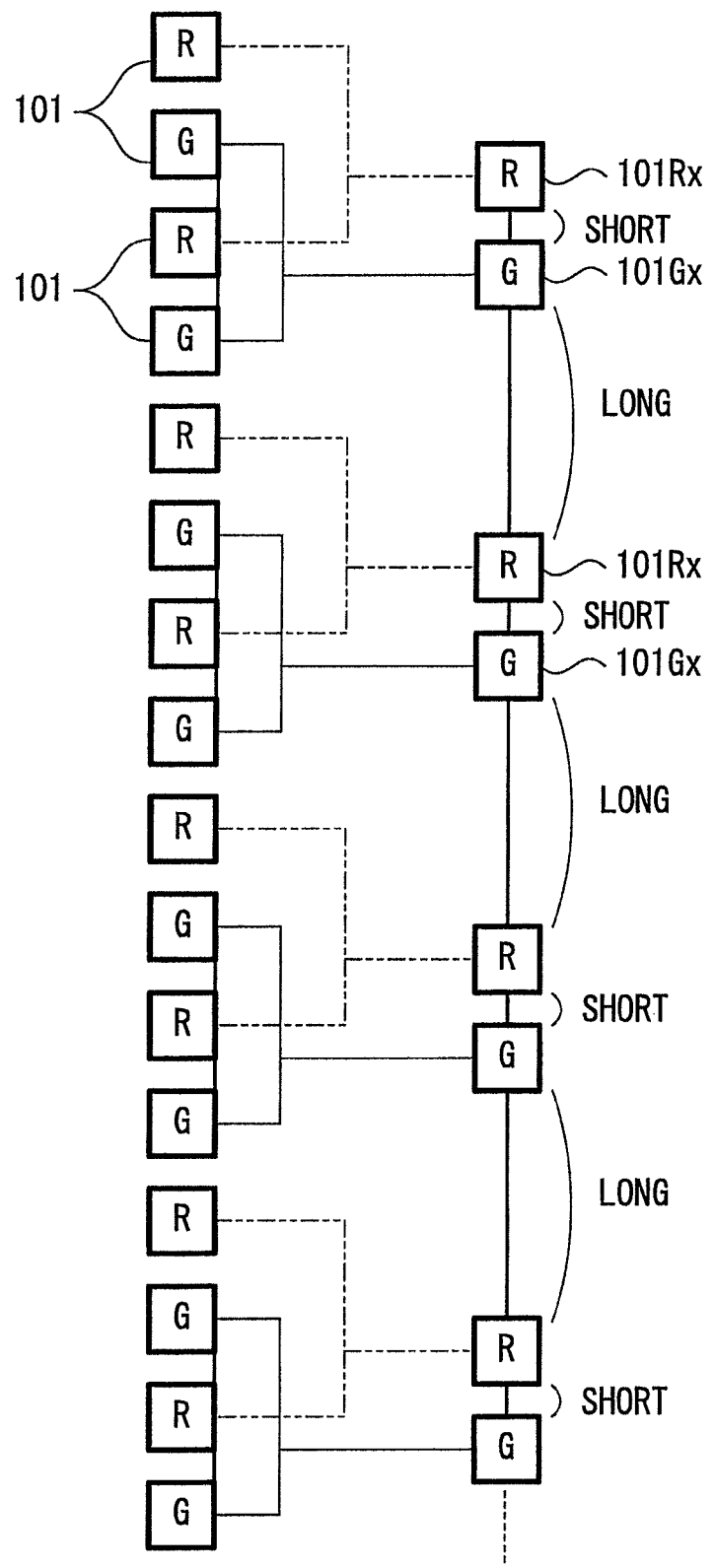
FIG. 4 is a schematic diagram showing an example of a pixel addition according to a related art.

Since the two pixel signals before addition have been differently weighted, the spatial positions of the center of gravity of the added pixel signal Ra and the added pixel signal Ga deviate from the positions of the center of gravity of simply added signals shown in FIG. 4.

In the example in which the spatial positions of the center of gravity of the added pixel signal Ra and the added pixel signal Ga are shifted, shown on the right-hand side of FIG. 8, the intervals L of spatial positions of the center of gravity of the added pixel signal Ra and the added pixel signal Ga are nearly equal.

The frequencies of the two clocks that the frequency divider 116 outputs are necessary to be properly selected such that the intervals L are nearly equal. However, if the intervals L of the spatial positions of the center of gravity are more close to equally-spaced intervals than an unequal interval shown in FIG. 4 of the related art, false colors can be prevented accordingly. Thus, the equal interval of the spatial positions of the center of gravity is not a condition for obtaining the effect of this embodiment.

Thus, according to this embodiment, pixels are added such that the intervals of the positions of the center of gravity of the added pixel signals are nearly equal, so that false colors can be effectively prevented. As a result, the image quality of captured signals can be improved. In this case, the CMOS image sensor 100 can be achieved with a relatively simple structure by providing the frequency divider 116 to an image sensor of the related art and by moving a mechanism of controlling frequency division of the frequency divider 116.

In the foregoing embodiment, the positions of unit pixels that are added are just an example. Thus, the present invention is not limited to this addition structure. Moreover, in the foregoing embodiment, two types of clock periods (clock frequencies) are provided to be selected. Instead, three or more clock periods may be provided and they may be properly selected such that the spatial positions of added images become nearly equally-spaced.

In addition, in the description with respect to FIGS. 7A to 7C, the count value of the counter 121 is up-counted in each of the reset component detection period and the pixel signal detection period. Instead, another count state may be selected.

For example, the count value may be down-counted in each of the reset component detection period and the pixel signal detection period.

Alternatively, the count value may be down-counted in the reset component detection period and up-counted in the pixel signal detection period.

Further, the count value may be successively up-counted or down-counted in a plurality of vertical synchronization periods.

In the foregoing description, an output of the counter 121 of the ADC 120 is read by the signal process circuit 114 and the signal process circuit 114 adds a plurality of unit pixel signals. Instead, a plurality of unit pixel signals may be added in the ADC 120 (or immediately after they are output from the ADC 120). For example, the latch section of the counter 121 may store a plurality of pixel signals and add the unit pixel signals.

Next, with reference to FIG. 9, an example of the structure of a camera apparatus that has the CMOS image sensor 100 of the first embodiment of the present invention will be described.

In this example, the CMOS image sensor 100 obtains a captured image signal based on image light that enters the CMOS image sensor 100 through an optical system 201 such as a lens. The obtained captured image signal is supplied as a signal that is output from the signal process circuit 114 to a downstream image signal process section.

In this example, an image signal that is output from the signal process circuit 114 is supplied to a still image signal process section 202 or a moving image signal process section 203. The still image signal process section 202 and the moving image signal process section 203 perform image signal processes to process the image signal into those in predetermined still image and moving image formats, respectively. An image signal processed by one of the process sections 202 and 203 is stored in a storage section (record section) 204. The processes from the image capturing process to the storing process are executed under the control of a control section 205.

Figure 9:
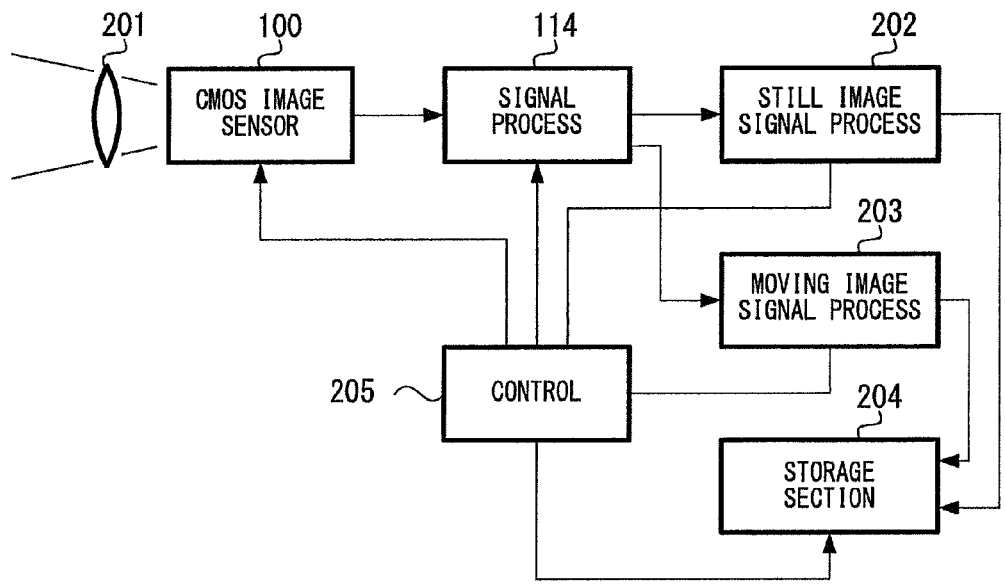
FIG. 9 is a schematic diagram showing an example of the structure of a camera apparatus according to the first embodiment of the present invention.
Figure 10:
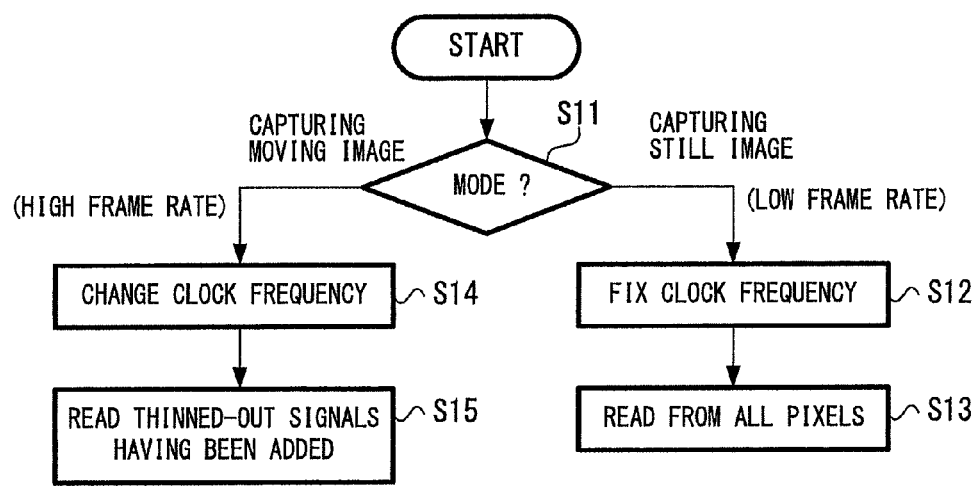
FIG. 10 is a flowchart showing an example of processes for modes of the camera apparatus according to the first embodiment of the present invention.

FIG. 10 is a flowchart showing an example that the control section 205 of the camera apparatus shown in FIG. 9 controls the operation of the CMOS image sensor 100 according to capturing modes.

First, when an image is captured, the control section 205 determines whether the current image capturing mode is a low frame rate (e.g., 30 fps) mode for still image capturing or a high frame rate (e.g., 60 fps) mode for moving image capturing (at step S11).

If the determined result denotes that the current mode is the low frame rate mode, the control section 205 fixes the period of the clock supplied to the DAC 108 and the counters 121 (at step S12), outputs all unit pixel signals, and obtains an image signal (at step S13).

If the current mode is the high frame rate mode, the control section 205 changes the period of the clock supplied to the DAC 108 and the counters 121 (at step S14), outputs the thinned-out unit pixel signals resulting from additions of unit pixels, and obtains an image signal (at step S15).

Since the frequency of the clock in the CMOS image sensor 100 is changed depending on the mode that has been set up in the camera apparatus, an effect is obtained that an image can be appropriately captured in each mode.

Figure 11:
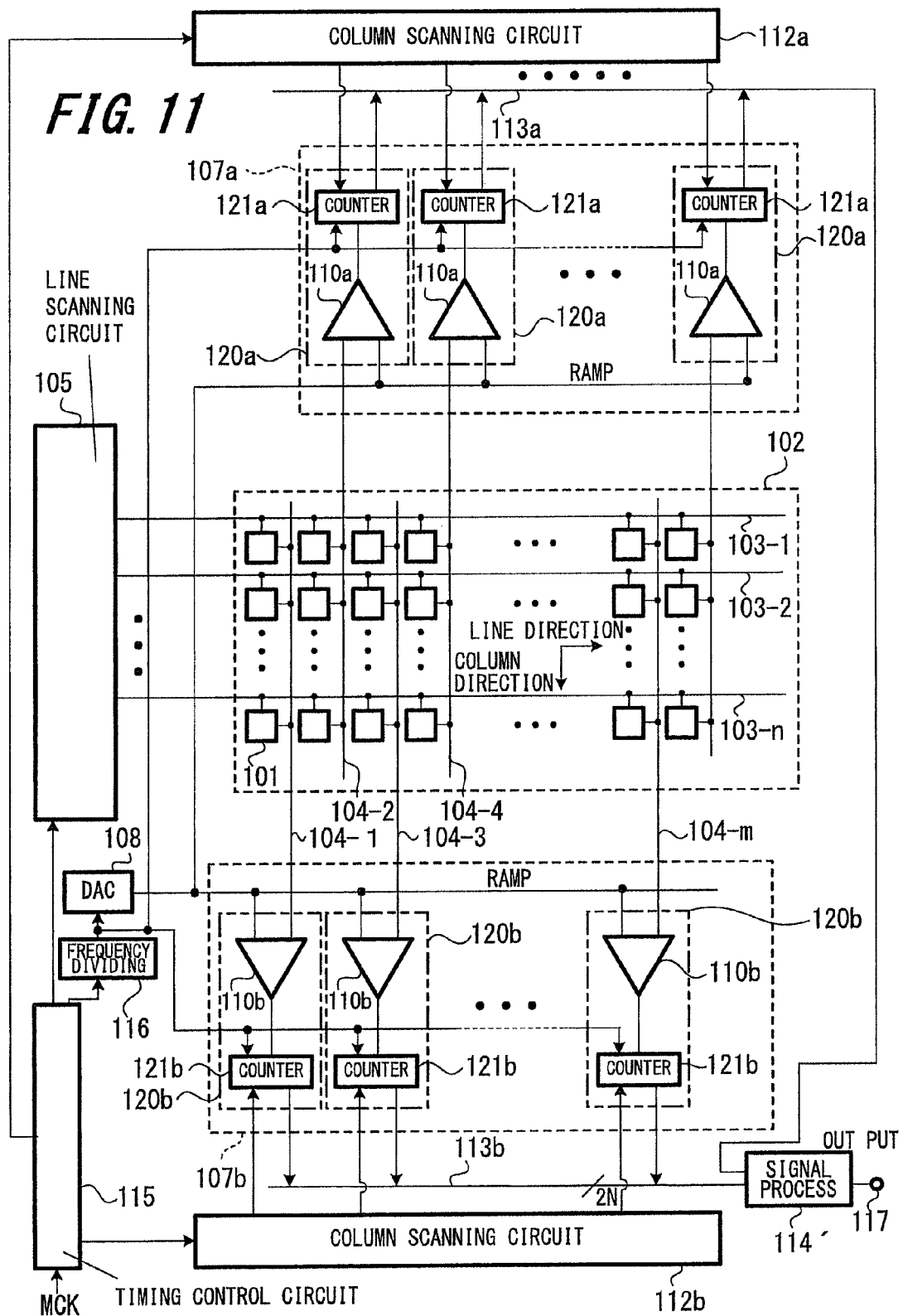
FIG. 11 is a schematic diagram showing an example of the structure of a solid state image capturing apparatus according to a second embodiment of the present invention.

Next, with reference to FIG. 11, a second embodiment of the present invention will be described. In FIG. 11, sections corresponding to FIG. 1 and FIG. 8 are denoted by similar reference numerals.

In this embodiment, a so-called top/bottom read type image sensor is provided.

A column process section 107a is disposed on the upper side of a pixel array section 102 and a column process section 107b is disposed on the lower side of the pixel array section 102.

The upper column process section 107a has ADCs 120a that digitally convert signals of every other vertical line. Each of the ADCs 120a has a comparator 110a and a counter 121a for the digital conversion process.

The lower column process section 107b has ADCs 120b that digitally convert signals of every other vertical line that are not supplied to the upper column process section 107a. Each of ADCs 120b has a comparator 110b and a counter 121b for the digital conversion process.

A DAC 108 supplies a ramp waveform to the comparators 110a of the upper column process section 107a and the comparators 110b of the lower column process section 107b. In addition, a frequency divider 116 supplies a clock to the counters 121a of the upper column process section 107a and the counters 121b of the lower column process section 107b. The clock is supplied to the DAC 108 and the counters 121b through the frequency divider 116. The frequency divider 116 is operated in the same conditions as those of the first embodiment. In this embodiment, column scanning circuits 112a and 112b are disposed at top and bottom of the CMOS image sensor, individually.

A signal that is output from the horizontal output wire 113a on the upper column process section 107a side and a signal that is output from the horizontal output wire 113b on the lower column process section 107b side are supplied to a signal process circuit 114' (as an addition section) to form an image signal of one frame. The image signal processed in the signal process circuit 114' is output from an output section 117.

The other structures of the second embodiment are the same as those of the CMOS image sensor 100 shown in FIG. 5.

In such a top/bottom read type CMOS image sensor, also by changing the clock frequency when pixels are added, the same effect as the first embodiment is obtained, preventing occurrence of false colors and improving image quality.

The top/bottom read structure shown in FIG. 11 is just an example. Thus, the structure of this embodiment is not limited to that shown in FIG. 11. In FIG. 11, unit pixels of respective columns (vertical lines) are alternately read by the upper and lower process sections. However, various types of top/bottom read structures that have been proposed or practically used can be applied.

It should be understood by those skilled in the art that various modifications, combinations, sub-combinations and alternations may occur depending on design requirements and other factors insofar as they are within the scope of the appended claims or the equivalents thereof.

What is claimed is:

1. A solid state image capturing apparatus, comprising:
   a pixel array section having unit pixels containing photo-electric conversion elements, the unit pixels being two-dimensionally arranged in a matrix, and column signal wires being arranged correspondingly to columns of the matrix of the unit pixels;
   a line scanning section configured to selectively control lines of the matrix of the unit pixels of the pixel array section;
   an analog-to-digital conversion section configured to convert an analog signal that is output from unit pixels of a line of the matrix of the unit pixels selected by the line scanning section through a corresponding column signal line to a digital signal;
   a conversion clock supply section configured to selectively generate a conversion clock having a first clock period or a conversion clock having a second clock period that is supplied to the analog-to-digital conversion section and supply a generated conversion clock to the analog-to-digital conversion section; and
   an addition section configured to add unit pixel digital signals converted in the analog-to-digital conversion section by the conversion clocks having the first clock period and the second clock period, respectively, and output an added pixel signal.

2. The solid state image capturing apparatus as set forth in claim 1,
   wherein in the pixel array section, color filters of a plurality of colors are arranged for respective unit pixels in a predetermined order, and
   wherein the unit pixel digital signals converted by the conversion clocks having the first clock period and the second clock period, respectively, are signals of the unit pixels for which color filters of the same color have been arranged.

3. The solid state image capturing apparatus as set forth in claim 2,
   wherein spatial virtual positions of added signals of unit pixels added by the addition section for which color filters of a first color have been arranged, and spatial positions of added signals of unit pixels added by the addition section for which color filters of a second color have been arranged at nearly equally-spaced intervals.

4. The solid state image capturing apparatus as set forth in claim 3,
   wherein the conversion clock supply section has a frequency divider configured to convert the conversion clock having the first clock period into the conversion clock having the second clock period.

5. A camera apparatus, comprising:
   a pixel array section having unit pixels containing photo-electric conversion elements, the unit pixels being two-dimensionally arranged in a matrix, and column signal wires being arranged correspondingly to columns of the matrix of the unit pixels;
   a line scanning section configured to selectively control lines of the matrix of the unit pixels of the pixel array section;
   an analog-to-digital conversion section configured to convert an analog signal that is output from unit pixels of a line of the matrix of the unit pixels selected by the line scanning section through a corresponding column signal line to a digital signal;
   a conversion clock supply section configured to selectively generate a conversion clock having a first clock period or a conversion clock having a second clock period that is supplied to the analog-to-digital conversion section and supplies a generated conversion clock to the analog-to-digital conversion section;
   an addition section configured to add unit pixel digital signals converted in the analog-to-digital conversion section by the conversion clocks having the first clock period and the second clock period, respectively, and outputs an added pixel signal; and
   an image signal process section configured to process the digital signal that is output from the addition section into an image signal having a predetermined format.

6. The camera apparatus as set forth in claim 5,
   wherein when the addition section does not add the digital signals, the conversion clock supplied from the conversion clock supply section to the analog-to-digital conversion section is fixed at the first clock period, and when the addition section adds digital signals, the conversion clock supply section selectively generates the conversion clocks having the first clock period and the second clock period, respectively.

* * * * *